United States Patent [19]

Bowden

[11] 3,936,934
[45] Feb. 10, 1976

[54] CULINARY CORING DEVICE

[76] Inventor: Nancy Bowden, 40 E. Clinton Ave., Tenafly, N.J. 07670

[22] Filed: Jan. 23, 1975

[21] Appl. No.: 540,890

[52] U.S. Cl. .............................................. 30/113.2
[51] Int. Cl.² ...................... A47J 23/00; A47J 25/00
[58] Field of Search.............. 30/113.2, 113.1, 113.3

[56] References Cited
UNITED STATES PATENTS

| 549,680 | 11/1895 | Morley | 30/113.2 |
|---|---|---|---|
| 1,539,156 | 5/1925 | Burgess | 30/113.2 |
| 1,646,564 | 10/1927 | Vaughan | 30/113.2 |
| 1,994,473 | 3/1935 | Jones | 30/113.2 |

*Primary Examiner*—Al Lawrence Smith
*Assistant Examiner*—J. T. Zatarga

[57] ABSTRACT

A culinary core for the coring of apples, pears, pineapples, oranges and other fruits as might be desired, formed from a single strip of metal stamped and cut-out in the shape of an elongated strip having a pointed spoon bowl at each end thereof with sharpened points and edges of the spoon bowl and with a pressed rigid in handle for strengthening thereof and with the elongated handle being U-bent into the form and shape of tongs, with the spoon bowls at the opposite ends of the strip being positioned into opposing relationship to one another pointed in a common direction with relationship to one another pointed in a common direction with the concavities of the respective spoons facing one another.

2 Claims, 3 Drawing Figures

CULINARY CORING DEVICE

This invention relates to a culinary device for the coring of various fruits.

BACKGROUND TO THE INVENTION DISCLOSURE

Prior to the present invention, there have existed a variety of coring devices, but unfortunate these devices have been less than efficient for speedy use in the obtaining a high rate of production in the coring of various fruits, as well as such devices being often of a type requiring a person having substantial skill in the use thereof in order to safely and/or effectively use the same, and such devices often being complicated in structure resulting in a high cost of manufacture thereby eliminating the availability of such a device to the housewife during the current-day society of high cost of materials and high cost of process of manufacture.

SUMMARY OF THE INVENTION

Accordingly, objects of the present invention are to overcome one or more difficulties and disadvantages of the types discussed above as well as to obtain novel advantages and structures not heretofore available.

Another object is to obtain a culinary corer which may be simply and inexpensively stamped out of a bendable and substantially rigid and possibly somewhat-resilient structure producible from pressably strip sheets metal or plastic.

Another object is to obtain a culinary corer which is effective both for a cutting-out of the core and for subsequent release of the core material from the device.

Other objects become apparent from the preceding and following disclosure.

One or more objects of the present invention are obtained by the invention as defined herein.

Broadly the invention includes a handle having extending in a common direction therefrom at one end thereof two spaced-apart substantially parallel spoon bowl positioned with concavities thereof in opposing relationship to one another with each of the spoon bowls being substantially sharply pointed and having edges thereof sharpened, the handle preferably being unitary and continuous with each of the spoon bowls in the form of tongs. The tongs preferably are formed from a unitary metallic flat-faced strip cut and pressed into an elongated shape having the spoon bowls at each of opposite ends extending in opposite directions from one another with preferably a strengthening rigid press-formed therein running at least partially the length of the handle portions of the legs of the tongs adjacent the respective spoons for the strengthening of the handle portions, with the handle portions being thereafter bent into the U-shape in the form of tongs such that the concave portions of the respective spoons are in opposing relationship to one another facing one another, and with the flattened faces of the tong handles in opposing relationship. Preferably the metal strip is substantially rigid but with a minor degree of resiliency such that during the coring they may be pressed slightly towards one another during the twisting thereof into the center of the fruit around the core of fruits such as pineapples, apples or around the eye of potatoes in the eye-removal therefrom, or the like, and thereafter by release of inward pressures on the tong legs the core material is permitted to drop from between the concave surfaces of the opposing spoon bowls.

The invention may be better understood by making reference to the Figures as follow.

THE FIGURES

DETAILED DESCRIPTION OF THE INVENTION

Figure 1:
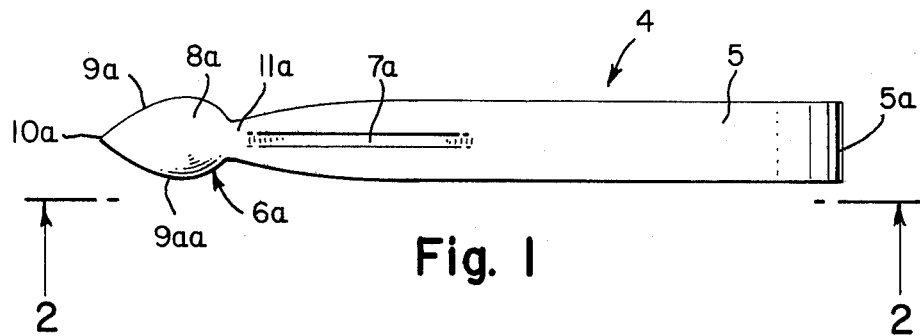
FIG. 1 illustrates an elevation plan view of the tongs of a preferred embodiment of the present invention.
Figure 2:
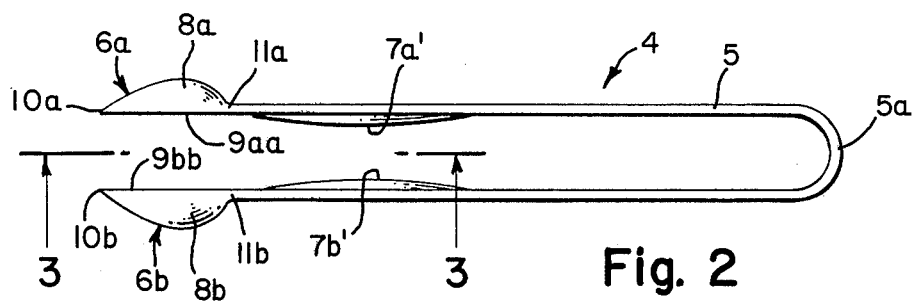
FIG. 2 illustrates a view of the embodiment of FIG. 1 as taken along lines 2—2 of FIG. 1.
Figure 3:
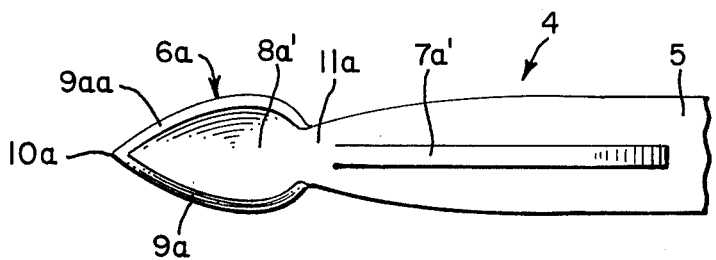
FIG. 3 illustrates an in-part view in plan elevation as taken along lines 3—3 of FIG. 2.

In greater details, FIGS. 1 through 3 disclose a preferred emboidment of the invention, for the tongs 4 having the handling element 5 which includes 5' and 5'' respectively, each respectively having integral and unitary therewith at the distal end thereof spoon bowls 6a and 6b respectively. Extending longitudinally down the respective legs 5' and 5'' are pressed-in ridges 7a' and 7b', for example the rigid 7a' being viewed in FIG. 1 as a crease 7a. In each of FIGS. 1 and 2 for the respective spoons there is viewable the convex hump portions 8a and 8b respectively of the spoon bowl 6a and 6b respectively, while in the FIG. 3 illustration there is viewable concavity (concave base wall structure) 8a'. The respective spoon bowl edges 9aa and 9bb are preferably sharpened edges thereby facilitating the cutting of the core of a fruit during a twisting action of the core while pressing the tong downwardly into the apple or orange or pineapple or the like being cored, the respective spoon bowls having sharpened pointed distal ends 10a and 10b respectively for the piercing of the fruit by pressing downwardly and forwardly the twist coring action while maintaining the spoon bowl 6a and 6b in the illustrated spaced-apart relationship to one another such that the coring material may be cut and positioned and clamped therebetween while gripping action on the respective legs 5' and 5'' on the legs towards one another serves to hold the core material until the core is withdrawn at which time the spreading of the tong is releases the core. Respective spoon bowls are integral with the respective legs at 11a and 11b.

It is within the scope of the present invention to make such variations and modifications as would be apparent to a person having ordinary skills.

I claim:

1. A culinary device comprising in combination: a handle element having opposite distal ends thereof projecting in a common direction, said handle element being tong-shaped with the opposite distal ends thereof extending in said common direction and having two separate and spaced-apart spoon bowls mounted unitarily one from one of the distal ends and the other from the remaining other distal end as a unitary single stamped-strip of material with the handle element being bent into substantially a U-shape, said spoon bowls being of substantially shallow oval shapes positioned one relative to the other with their concavities in opposing relationship to one another and with the distal ends of the respective spoon bowls pointed both in said common direction, peripheral edges of each of said spoon bowls being substantially sharpened as cutting edges, a ridge-projection being formed in each of the legs of the handle element of the U-shape strip at respective positions adjacent the spoon bowls respectively, with each rigid projection extending in a direction parallel to a longitudinal axis of the handle element whereby each leg of the U-shape strip is strengthened adjacent the respective spoon bowl.

2. The culinary device of claim 1, in which said spoon bowls and said handle element are of metallic composition.

* * * * *